United States Patent
Hwang

(10) Patent No.: US 7,090,278 B2
(45) Date of Patent: Aug. 15, 2006

(54) GRIP HANDLE AT PASSENGER SEAT IN AUTOMOBILE

(75) Inventor: Sung-Won Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/198,227

(22) Filed: Aug. 8, 2005

(65) Prior Publication Data

US 2006/0055198 A1   Mar. 16, 2006

(30) Foreign Application Priority Data

Sep. 15, 2004   (KR) .................... 10-2004-0073953

(51) Int. Cl.
*B60N 3/02*   (2006.01)
(52) U.S. Cl. ............... 296/71; 296/1.02; 16/444
(58) Field of Classification Search ........... 296/1.02, 296/70, 71; 16/444
See application file for complete search history.

(56) References Cited

U.S. PATENT DOCUMENTS

| | | | | |
|---|---|---|---|---|
| 1,599,924 A | * | 9/1926 | Sanborn | 16/444 |
| 5,519,917 A | * | 5/1996 | Cordonnier | 16/422 |
| 5,529,370 A | * | 6/1996 | Veit | 296/146.7 |
| 5,652,999 A | * | 8/1997 | Jarvis | 16/444 |
| 5,931,525 A | * | 8/1999 | Rickabus | 296/214 |
| 6,409,249 B1 | * | 6/2002 | Han | 296/146.7 |
| 6,431,640 B1 | * | 8/2002 | Sakuma et al. | 296/187.05 |
| 6,499,782 B1 | * | 12/2002 | Kwon | 296/1.02 |
| 6,715,812 B1 | * | 4/2004 | Sakuma et al. | 296/1.02 |

FOREIGN PATENT DOCUMENTS

| | | | | |
|---|---|---|---|---|
| JP | 359008539 A | * | 1/1984 | 296/71 |
| JP | 405213103 A | * | 8/1993 | 296/71 |
| JP | 2002-104048 | | 4/2002 | |
| JP | 2003-137012 | | 5/2003 | |

OTHER PUBLICATIONS

English language Abstract of JP 2002-104048.
English language Abstract of JP 2003-137012.

* cited by examiner

*Primary Examiner*—D. Glenn Dayoan
*Assistant Examiner*—Greg Blankenship
(74) *Attorney, Agent, or Firm*—Greenblum & Bernstein, P.L.C.

(57) ABSTRACT

A grip handle at a passenger seat in an automobile includes an instrument panel having at least one hole formed therethrough in front of the passenger seat, a core, made of hard plastic, including at least one insert hole formed therethrough, into which an insert bolt fixed to the hole of the instrument panel is inserted, such that the core is formed integrally with the insert bolt by insert molding, and a plurality of contraction prevention grooves formed in the front surface thereof in a longitudinal direction, and a skin, made of soft plastic, formed outside the core by double insert molding.

2 Claims, 2 Drawing Sheets

GRIP HANDLE AT PASSENGER SEAT IN AUTOMOBILE

RELATED APPLICATIONS

The present disclosure relate to subject meter container in Korean Application NO. 10-2004-073953, filed on Sep. 15, 2004, which is herein expressly incorporated by reference in their entirety.

BACKGROUND OF THE INVENTION

1. Field of the Invention

The present invention relates to a grip handle at a passenger seat in an automobile, and more particularly to a grip handle, installed on an instrument panel at a passenger seat in an automobile, which is formed by double injection molding so as to prevent external damage thereof generated due to contraction after molding.

2. Description of the Related Art

When an automobile travels on a rough road surface, passengers cannot keep their balance due to the shaking of a frame of the automobile. In this case, in order to allow a passenger at a passenger seat to support his/her body moving due to the shaking of the frame of the automobile, a grip handle 1 is installed on an instrument panel 2 located at a front portion of an indoor space of the automobile, as shown in FIG. 1.

The conventional grip handle 1 comprises insert bolts 3a and 3b formed on both ends thereof, and is fixed to the instrument panel 2 by inserting the insert bolts 3a and 3b into holes 4a and 4b, which are formed through both sides of an upper surface of the instrument panel 2 in front of the passenger seat, and then fastening the insert bolts 3a and 3b to the holes 4a and 4b using nuts inside the instrument panel 2.

However, since the insert bolts 3a and 3b, which are made of steel, are integrated with a main body of the above conventional grip handle 1, which is made of plastic, by insert molding, the grip handle 1 is physically damaged or broken due to a difference of degrees of thermal contraction between the two materials.

SUMMARY OF THE INVENTION

Therefore, the present invention has been made in view of the above problems, and it is an object of the present invention to provide a grip handle, installed on an instrument panel at a passenger seat in an automobile, in which a core is formed integrally with insert bolts by insert molding, and then a skin, gripped by a passenger's hand, is formed outside the core by double insert molding, such that insert holes, into which the insert bolts are inserted, are formed through the core and contraction prevention holes are formed in the core in a longitudinal direction, thereby not exposing deformation of the core due to contraction after molding while reducing the contraction of the core.

In accordance with the present invention, the above and other objects can be accomplished by the provision of a grip handle at a passenger seat in an automobile, comprising: an instrument panel having at least one hole formed therethrough in front of the passenger seat; a core, made of hard plastic, including at least one insert hole formed therethrough, into which an insert bolt fixed to the hole of the instrument panel is inserted, such that the core is formed integrally with the insert bolt by insert molding, and a plurality of contraction prevention grooves formed in the front surface thereof in a longitudinal direction; and a skin, made of soft plastic, formed outside the core by double insert molding.

Preferably, a knob may be formed integrally with an end of the insert hole so as to reduce the contraction of the insert hole.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings.

Figure 1:
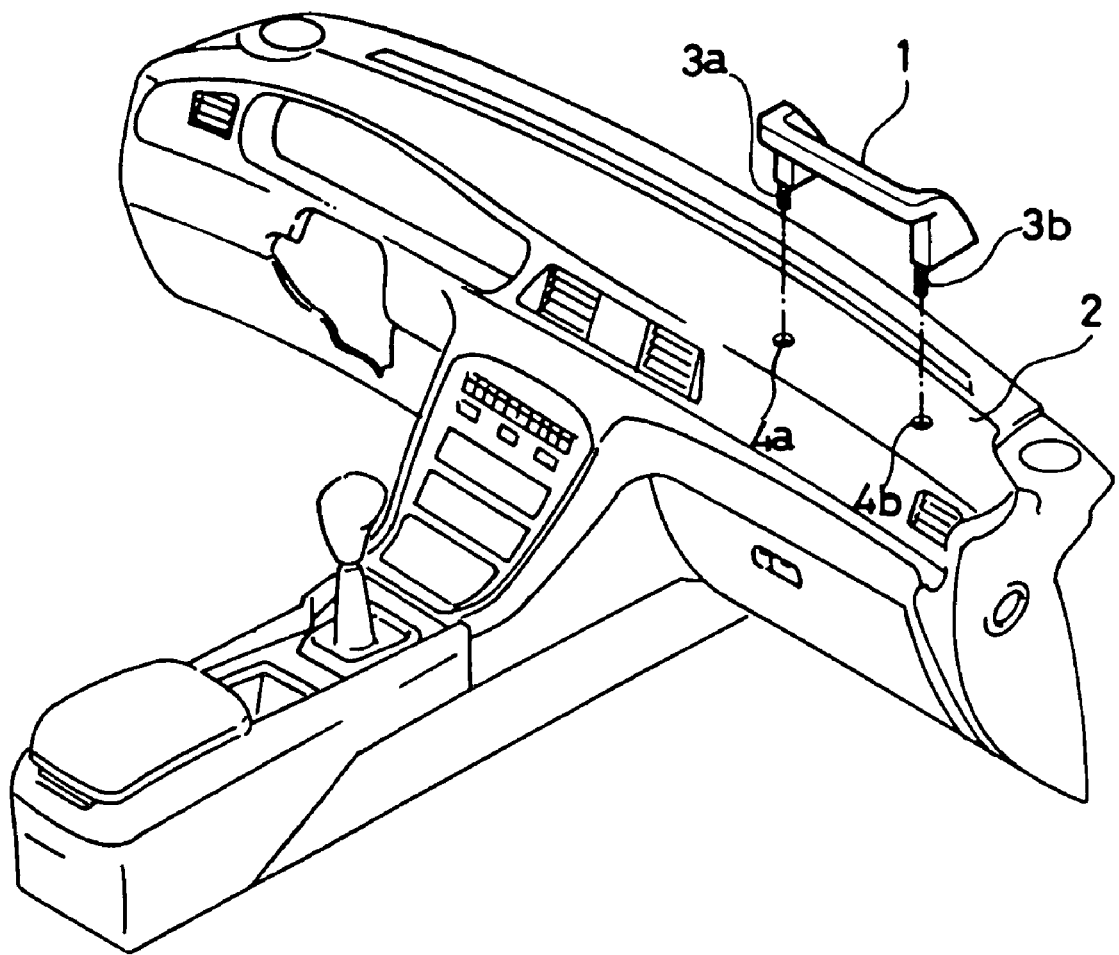
FIG. 1 is a perspective view illustrating an installation state of a conventional grip handle at a passenger seat in an automobile.
Figure 2:
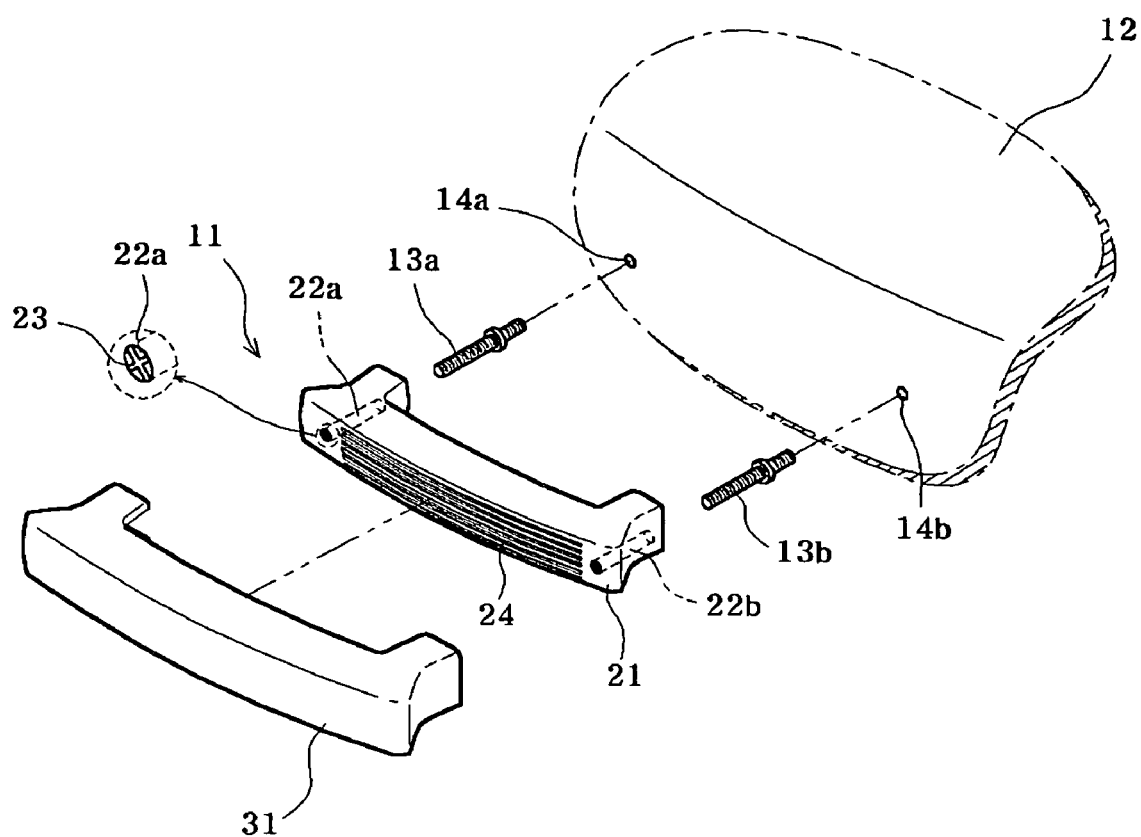
FIG. 2 is an exploded perspective view illustrating an installation state of a grip handle at a passenger seat in an automobile in accordance with the present invention.

FIG. 2 is an exploded perspective view illustrating an installation state of a grip handle at a passenger seat in an automobile in accordance with the present invention.

As shown in FIG. 2, the grip handle 11 at the passenger seat in the automobile comprises a core 21, which is formed integrally with insert bolts 13a and 13b by insert molding, and a skin 31, which is formed by double insert molding to form an external cover.

The core 21 has a thickness and length suitable to be held by a passenger's hand.

Insert holes 22a and 22b are formed through the core 21. Ends of the insert bolts 13a and 13b are inserted into the insert holes 22a and 22b, and the core 21 is formed integrally with the insert bolts 13a and 13b by insert molding.

The other ends of the insert bolts 13a and 13b are fastened into holes 14a and 14b formed through the instrument panel 12, thereby fixing the grip handle 11 to the instrument panel 12.

That is, the other ends of the insert bolts 13a and 13b are inserted into the holes 14a and 14b, and are then fastened by nuts (not shown) from the lower portion of the instrument panel 12.

Preferably, each of the insert holes 22a and 22b is formed at one of both edges of the core 21, and the holes 14a and 14b correspond to the insert holes 22a and 22b.

Since the core 21 maintains a high temperature when the insert bolts 13a and 13b are formed by insert molding, the core 21 has a lowered temperature and is contracted after molding.

Accordingly, in order to decrease a degree of contraction of the core 21, the core 21 is made of hard plastic.

Preferably, the core 21 is made of polyamide 6 (PA 6) used for extrusion molding.

In order to further decrease the degree of the contraction of the core 21, a plurality of contraction prevention grooves 24 are formed in the core 21 in a longitudinal direction.

The contraction prevention grooves 24 serve to provide unevenness to the surface of the core 21, thereby decreasing the degree of contraction of the core 21.

Since the core 21 is made of plastic and the insert bolts 13a and 13b are made of steel, the core 21 and the insert bolts 13a and 13b have different degrees of contraction at a normal temperature after insert molding at a high temperature.

That is, in terms of material, the degree of contraction of the core 21 is higher than the degree of contraction of the insert bolts 13a and 13b.

The insert holes 22a and 22b of the core 21, into which the insert bolts 13a and 13b are inserted, having a diameter similar to that of the insert bolts 13a and 13b are not damaged or broken by the insert bolts 13a and 13b when the core 21 provided with the insert bolts 13a and 13b inserted into the insert holes 22a and 22b thereof are contracted.

Knobs 23 are respectively molded integrally with ends of the insert holes 22a and 22b.

That is, the knobs 23 are formed integrally with the ends of the insert holes 22a and 22b by insert molding, thereby supporting inner circumferential surfaces of the inert holes 22a and 22b so as to decrease contraction of the insert holes 22a and 22b.

The knobs 23 have a cross-shaped section.

The skin 31 is a portion contacting the passenger's hand, and forms an external cover surrounding the core 21.

Here, the skin 31 is made of soft plastic, thereby being stable to grip.

That is, preferably, the skin 31 is made of thermoplastic olefin (TPO).

After the core 21 and the insert bolts 13a and 13b are formed by insert molding, the skin 31 is formed by double insert molding, thereby improving efficiency in manufacturing the grip handle.

Since the skin 31 is formed by double insert molding so that the skin 31 surrounds the core 21, which is formed integrally with the insert bolts 13a and 13b by insert molding and may be thus deformed slightly due to contraction, the skin 31 improves the aesthetic appearance of the grip handle and reduces failures in manufacturing the grip handle.

Further, since the skin 31 is made of a soft material and has a small thickness within the limits of possibility, a passenger can sense the contraction prevention grooves 24 formed in the core 21 when the passenger grips the grip handle. Thereby, the skin 31 causes the passenger to feel a fine gripping sense.

As apparent from the above description, the present invention provides a grip handle at a passenger seat in an automobile, in which, a core and insert bolts are integrally formed by insert molding such that contraction prevention grooves formed in the core and knobs attached to the core serve to prevent the core from contracting, and then a skin forming an external cover is formed by double insert molding such that the core is surrounded by the skin, thereby having an improved aesthetic appearance and reducing failures in manufacturing the grip handle Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A grip handle at a passenger seat in an automobile, comprising:
    an instrument panel having at least one hole formed therethrough in front of the passenger seat;
    a core, made of hard plastic, including at least one insert hole formed therethrough, into which an insert bolt fixed to the hole of the instrument panel is inserted, such that the core is formed integrally with the insert bolt by insert molding, and a plurality of contraction prevention grooves formed in the front surface thereof in a longitudinal direction; and
    a skin, made of soft plastic, formed outside the core by double insert molding.

2. The grip handle as set forth in claim 1, wherein a knob is formed integrally with an end of the insert hole so as to reduce the contraction of the insert hole.

\* \* \* \* \*